(12) United States Patent
Belardi et al.

(10) Patent No.: US 6,968,107 B2
(45) Date of Patent: Nov. 22, 2005

(54) HOLEY OPTICAL FIBRES

(75) Inventors: Walter Belardi, Southampton (GB); Kentaro Furusawa, Southampton (GB); Tanya Monro, Southampton (GB); David Richardson, Southampton (GB); Paul Turner, Southampton (GB)

(73) Assignee: University of Southampton, Hampshire (GB)

( * ) Notice: Subject to any disclaimer, the term of this patent is extended or adjusted under 35 U.S.C. 154(b) by 0 days.

(21) Appl. No.: 10/344,731

(22) PCT Filed: Aug. 10, 2001

(86) PCT No.: PCT/GB01/03618

§ 371 (c)(1),
(2), (4) Date: Aug. 8, 2003

(87) PCT Pub. No.: WO02/16980

PCT Pub. Date: Feb. 28, 2002

(65) Prior Publication Data

US 2004/0022508 A1 Feb. 5, 2004

Related U.S. Application Data

(60) Provisional application No. 60/230,458, filed on Sep. 6, 2000.

(30) Foreign Application Priority Data

Aug. 18, 2000 (EP) .................................... 00307090

(51) Int. Cl.⁷ .............................................. G02B 6/02
(52) U.S. Cl. ...................... 385/127; 385/125; 385/126; 65/385; 65/428
(58) Field of Search ................................ 385/123–127, 385/147; 65/385, 428, 435, 393

(56) References Cited

U.S. PATENT DOCUMENTS

| 5,802,236 A | 9/1998 | DiGiovanni et al. | |
| 6,571,045 B2 * | 5/2003 | Hasegawa et al. | 385/125 |
| 2003/0012535 A1 * | 1/2003 | Town | 385/125 |
| 2004/0052484 A1 * | 3/2004 | Broeng et al. | 385/125 |

FOREIGN PATENT DOCUMENTS

| EP | 0 810 453 A1 | 12/1997 |
| WO | WO 99/64903 | 12/1999 |

OTHER PUBLICATIONS

Birks, T. A., et al., "Full 2-D Photonic Bandgaps in Silica/Air Structures", Electronics Letters, vol. 31, No. 22, pp. 1941-1943, (Oct. 26, 1995).

(Continued)

*Primary Examiner*—Fayez G. Assaf
(74) *Attorney, Agent, or Firm*—Finnegan, Henderson, Farabow, Garrett & Dunner, L.L.P.

(57) ABSTRACT

An optical fiber structure having a holey fiber arranged in a holey outer support structure made up of holey tubes encased in a thin walled outer jacket. The holey fiber may have a solid core surrounded by a holey cladding having a plurality of rings of holes. With the invention it is possible to produce robust, coated and jacketed fibers with microstructured core features of micrometer size relatively easily using existing fiber fabrication technology. This improvement is a result of the outer holey structure which reduces the thermal mass of the supporting structure and makes it possible to reliably and controllably retain small hole features during the fiber fabrication process.

37 Claims, 3 Drawing Sheets

OTHER PUBLICATIONS

Bennett, P. J., et al., "Toward Practical Holey Fiber Technology: Fabrication, Splicing, Modeling and Characterization", Optics Letters, vol. 24, No. 17, pp. 1203-1205, (Sep. 1, 1999).

Bennett, P. J. et al., "A Robust, Large Air Fill Fraction Holey Fibre", CLEO '99, Baltimore, MD, May 23-28, 1999, IEEE, US, p. 293, (1999).

* cited by examiner

HOLEY OPTICAL FIBRES

CROSS REFERENCE TO RELATED APPLICATIONS

This application is a national phase application based on PCT/GB01/03618, filed Aug. 10, 2001, the content of which is incorporated herein by reference, and claims the priority of European Patent application No. 00307090.1, filed Aug. 18, 2000, the content of which is incorporated herein by reference, and claims the benefit of U.S. Provisional Application No. 60/230,458, filed Sep. 6, 2000, the content of which is incorporated herein by reference.

BACKGROUND OF THE INVENTION

The invention relates to holey fibres and to a method of fabricating holey fibres and holey fibre preforms.

A holey fibre is an optical fibre whose optical confinement mechanism and properties are affected by an array of air holes defined by cavities that run lengthwise down the fibre. Light can be guided within holey fibres by two distinct mechanisms. First, with periodic arrangements of air holes, guidance can be obtained through photonic band gap effects [1]. Second, guidance can be obtained from volume average refractive index effects. This second guidance mechanism does not rely on periodicity of the air holes [2].

Generally, a holey fibre has a solid core (FIG. 1A of the accompanying drawings) or a hollow core (FIG. 1B of the accompanying drawings) surrounded by a holey cladding region. The holey fibres illustrated have a hole structure characterised by a hole diameter, d, and an interhole spacing, i.e. pitch, $\Lambda$.

A holey fibre structure is fabricated by stacking tubular capillaries in a hexagonal close packed array within a larger tube that forms an outer jacket or casing containing the capillaries. To form a solid core holey fibre as in FIG. 1A, one of the tubular capillaries is removed from the stack and replaced with a solid rod of the same outer dimensions. To form a hollow core holey fibre as in FIG. 1B, a number of capillaries in the centre of the stack are removed. The fibre stack is then drawn into a preform by a caning procedure and then placed in a fibre drawing tower and drawn into fibre. The finished holey fibre structure is then characterised by an inner core (solid or hollow) surrounded by a holey cladding. Fabrication of holey fibres is discussed further in the literature [3][4].

To realise holey fibres for many applications, it is desirable to fabricate a holey fibre with relatively small feature sizes, such as interhole spacing, i.e. pitch, $\Lambda \sim 1$–$2$ microns. Fibres with such small hole feature sizes have a number of interesting and unique properties such as anomalous dispersion at short wavelength, high optical nonlinearity and the possibility for large evanescent fields in air.

To satisfy the desire for small pitch, it is necessary to construct a preform structure with relatively small capillaries. Because of the small size of the capillaries, several hundred capillary elements are needed to provide a structure which is large enough to handle conveniently during the fabrication stages of preform caning and fibre drawing. Moreover, to be practical, the fabricated fibre needs to have an outer diameter of about 80 microns or more. However, the large number of small capillaries required to fulfil these requirements presents difficulties in the fabrication and also results in a weak fibre.

An improvement is to stack the capillaries within an outer jacket which has a relatively thick wall, as shown by FIG. 2 of the accompanying drawings which shows a thick wall silica outer jacket 1 defining an inner cylindrical space in which is placed two rings of silica cladding capillaries 2 which are arranged concentrically about a centrally placed solid silica core 4. In the illustrated example, the inner space of the outer jacket 1 is additionally sleeved by a vycore tube 3. The dimensions included on the top of the figure are exemplary preform dimensions in millimetres, whereas the dimensions at the bottom of the figure are target fibre dimensions in microns. Use of a thick wall outer jacket has the advantage of allowing the number of capillaries required to be greatly reduced.

The thick wall outer jacket approach has been demonstrated by other groups. However, in the experience of the present inventors at least, it has proved difficult to reliably and controllably retain small hole features during the fibre pulling stage of the fabrication process when using such thick walled outer jacket structures. It is believed that this problem is attributable to the relatively small ratio of air to glass in the thick-walled structure, and to the relatively large thermal mass of the glass of the outer jacket as the preform is melted in the drawing tower furnace during the fibre drawing process.

It is therefore an aim of the invention to provide an improved method for fabricating holey fibres with relatively small feature sizes.

SUMMARY OF THE INVENTION

According to a first aspect of the invention there is provided an optical fibre structure comprising a holey fibre arranged in a holey outer support structure.

The holey outer support structure preferably has a lateral feature size at least five or ten times greater than that of the holey fibre.

The holey fibre may have a solid or hollow core surrounded by a holey cladding which may comprise cavities arranged in a plurality of rings concentrically about the core, e.g. 2–6 or more rings.

The holey outer support structure is conveniently made of an arrangement of tubular structures, each of roughly the same lateral dimensions as the holey fibre. The lateral dimensions are preferably between one fifth and five times that of the holey fibre, preferably between one half and twice that of the holey fibre. The holey outer support structure may conveniently further comprise an outer jacket surrounding the tubular structures.

An optical fibre structure embodying the invention possesses a microstructured transverse cross section in which the microstructuring in the holey fibre itself is on the scale of the wavelength of the light guided by the holey fibre, but is on a considerably coarser scale within an outer holey structure supporting the holey fibre (e.g. five times, ten times or a greater multiple of the wavelength).

With the invention it is possible to produce robust, coated and jacketed fibres with microstructured core features relatively easily using existing fibre fabrication technology.

According to a second aspect of the invention there is provided an optical fibre preform comprising: (a) a core rod; (b) a plurality of cladding capillaries arranged around the core rod; (c) an inner jacket containing the cladding capillaries; and (d) a plurality of support capillaries arranged around the inner jacket. The preform may further comprise an outer jacket containing the support capillaries.

According to a third aspect of the invention there is provided a method of making a holey fibre preform comprising: (a) arranging a core rod and a plurality of cladding capillaries within a first jacket; (b) arranging the first jacket and a plurality of support capillaries in a second jacket to form a tube assembly; and (c) reducing the tube assembly to a preform. The support capillaries may be arranged within an outer jacket.

According to a fourth aspect of the invention there is provided a method of making a holey fibre comprising: (a) making a holey fibre preform according to the method of the third aspect; and (b) drawing a holey fibre from the preform. The support capillaries may be arranged within an outer jacket.

According to a fifth aspect of the invention there is provided a method of guiding light along a holey fibre structure comprising a holey fibre arranged in a holey outer support structure, the light having a mode field extending in a cross-sectional plane through the holey fibre, wherein the mode field is mainly confined in the holey fibre. In other words, the structure is designed so that the holey outer support structure does not contribute in any significant way to the optical guiding properties of the holey fibre contained within it. Preferably, the mode field has less than one of 10%, 5%, 2%, 1%, 0.5% and 0.01% of its power extending beyond the holey fibre into the holey outer support structure.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1A:
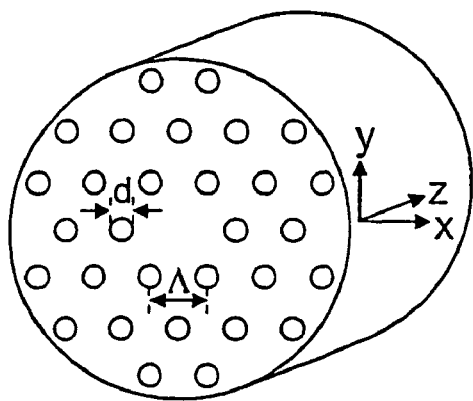
FIG. 1A is a schematic section of a solid core holey fibre.
Figure 1B:
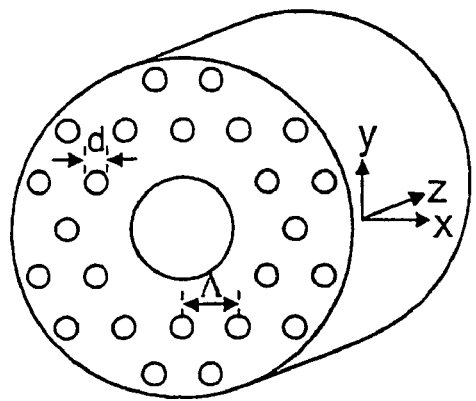
FIG. 1B is a schematic section of a hollow core holey fibre.
Figure 2:
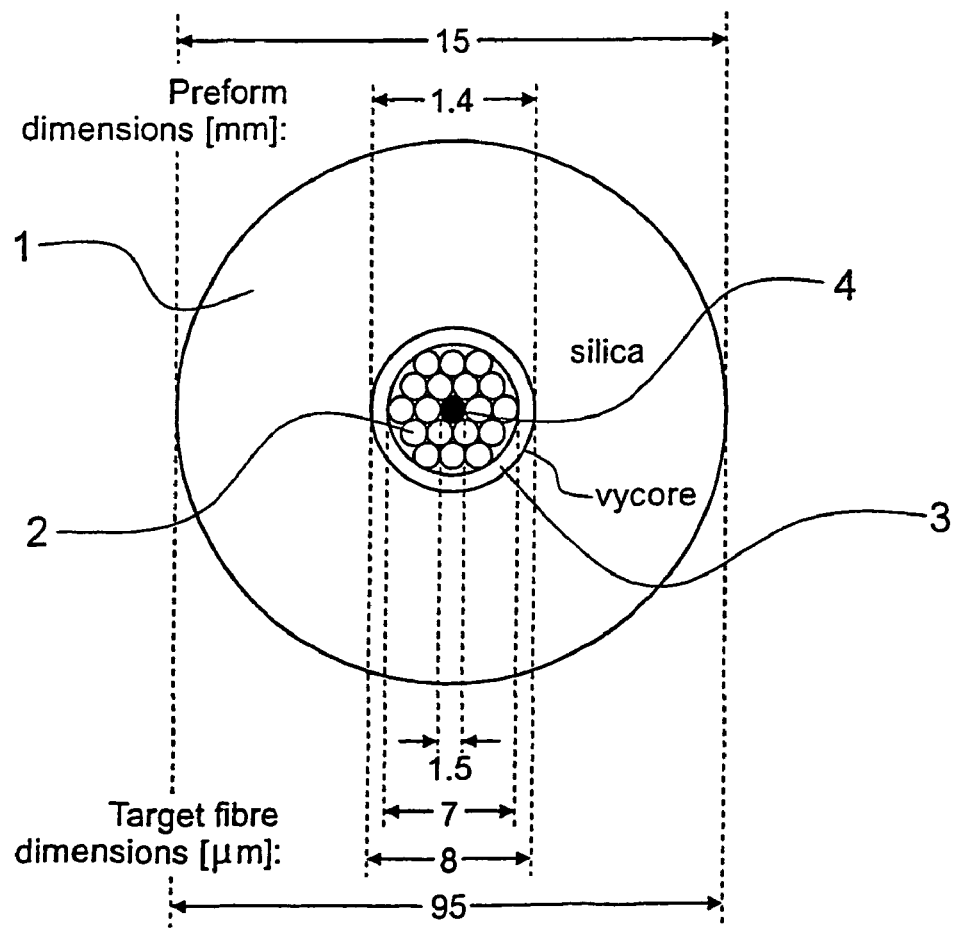
FIG. 2 is a schematic diagram of a holey fibre preform according to a prior art approach.

In order to get around the problem of applying a relatively thick-walled jacket, of large thermal mass, to a relatively fine microstructured inner cane, an approach has been adopted in the embodiments described below that may be viewed as replacing the thick wall outer jacket of the prior art approach of FIG. 2 with a combination of an outer thin wall jacket and an inner stack of relatively large capillaries. A microstructured inner cane containing the core and holey cladding is then supported by the larger scale capillaries.

Figure 3:
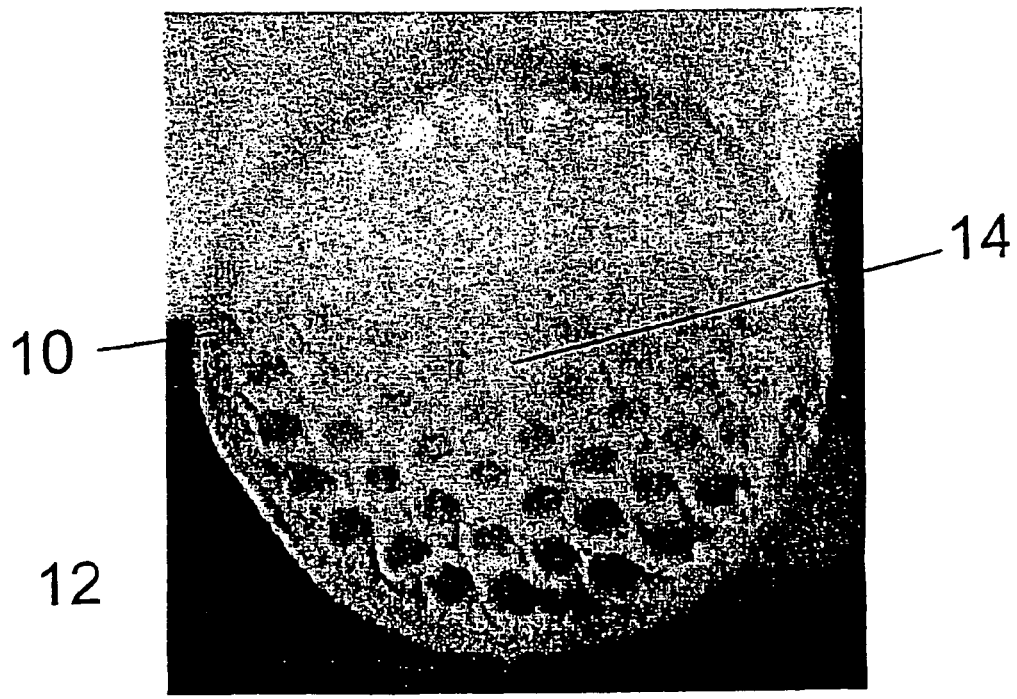
FIG. 3 is an end view of a holey fibre preform according to an embodiment of the invention.

FIG. 3 is an end view of a holey fibre preform according to this approach. The preform comprises an inner cane 14 containing the elements that will form the holey fibre after fibre drawing. Although not clearly evident from this figure, the central region comprises a solid core rod surrounded by a plurality of small capillaries arranged around the core rod, which ultimately form the holey cladding of the fibre. The rod and capillaries are retained in an inner jacket which forms the outer surface of the inner cane. The small cladding capillaries are arranged in one or more rings concentrically about the core rod. Generally at least two rings of cladding capillaries will be needed for most holey fibre applications. In fact, two is a preferred number, since it represents the smallest number of rings for providing the optical properties desired in many applications. The number of rings may be greater, e.g. three, four, five, six or more, but it should be borne in mind that very large numbers of capillaries will present fabrication difficulties, as described further above in relation to the prior art.

The inner cane 14 is supported by a plurality of relatively large-scale support capillaries 12 arranged around the inner cane. The support capillaries are retained in a relatively thin outer jacket 10. In an alternative embodiment, the outer jacket could be dispensed with and the support capillaries fused together at the top and bottom prior to pulling to hold them together. As can be seen from the figure, the support capillaries have an outside diameter approximately the same as the outside diameter of the inner cane 14, so that the inner cane can be arranged with the support capillaries in a hexagonal close packed array. More generally, it is convenient for the support capillaries to be of the same order of magnitude of lateral dimension as the inner cane. Preferably the support capillaries have lateral dimensions of between one fifth and five times that of the inner cane, more especially between one half and twice that of the inner jacket.

The capillaries can be made in a variety of ways. Typically, the starting point for the capillaries is a large-scale tube. The large-scale tubes can be produced by: extrusion, milling and drilling, polishing, piercing, spin/rotational casting, other casting methods (e.g. built-in casting), compression moulding, direct bonding etc. The tubes are then caned down using a fibre draw tower to the dimensions required for the preform assembly.

With this preform design, the thermal mass of the supporting structure used to bulk out the central region of the holey fibre is significantly reduced in comparison to a thick-wall outer jacket used in the prior art. It is thus easier to pull the preform and to retain the desired form of microstructure within the vicinity of the central holey fibre region.

The completed preform is then ready for the next main stage of fibre drawing. For drawing, the preform is placed in a fibre drawing tower. Fibre drawing is performed by the controlled heating and/or cooling of the silica or other glass through a viscosity range of around $10^6$ poise. It is useful to monitor the diameter and tension of the fibre as it is being drawn and use the data thus acquired in an automatic feedback loop to control the preform feed speed, the fibre draw speed and/or other parameters related to the furnace in order to yield a uniform fibre diameter.

A principal component of the drawing tower used to pull the preform into fibre form is a heat source, which may be a graphite resistance heater or a radio-frequency (RF) furnace.

It is critical to control the fibre drawing temperature, and hence the glass viscosity, so that two criteria are met. First, the fibre drawing temperature must soften the glass to provide a viscosity for which the glass can deform and stretch into a fibre without crystallisation. Second, the softening of the glass must not be so great that the crucial internal structure, i.e. the holes, collapse and flow together. Cooling is provided above and below the furnace's hot zone. The cooling keeps the glass outside the hot zone cooled to below its crystallisation temperature.

Figure 4:
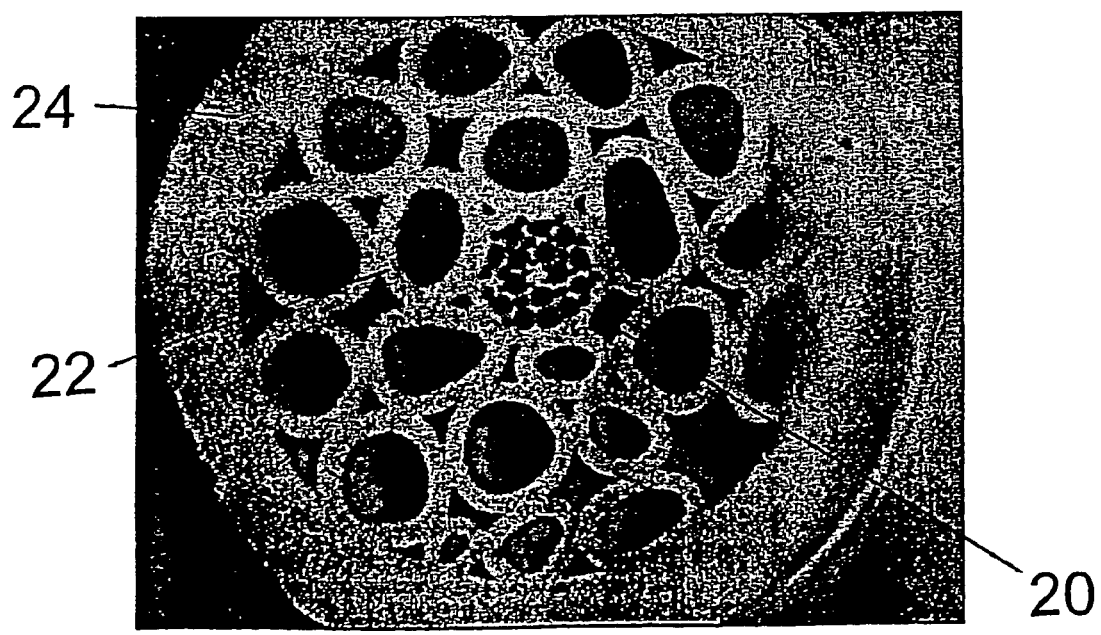
FIG. 4 is a cross-section of a holey fibre structure according to an example of the invention.

FIG. 4 is a cross-section of a holey fibre structure according to an example of the invention which has been drawn from a preform generally of the kind illustrated in FIG. 3.

It is evident that the basic structure of the preform has been retained in the drawn holey fibre structure. Namely, the drawn holey fibre structure comprises a holey fibre 20 arranged in a holey outer support structure. The holey outer support structure comprises an arrangement of tubular structures 22 laterally bounded by a relatively thin wall outer jacket 24 of outer diameter approximately equal to 250 microns. The outer dimensions is preferably at least 80 microns. A preferred range of outer dimensions is 80 microns to between 1–5 mm. The internal structure of the holey fibre at the centre of the structure is just visible in FIG. 4, but is better seen in the enlarged view of FIG. 5.

Figure 5:
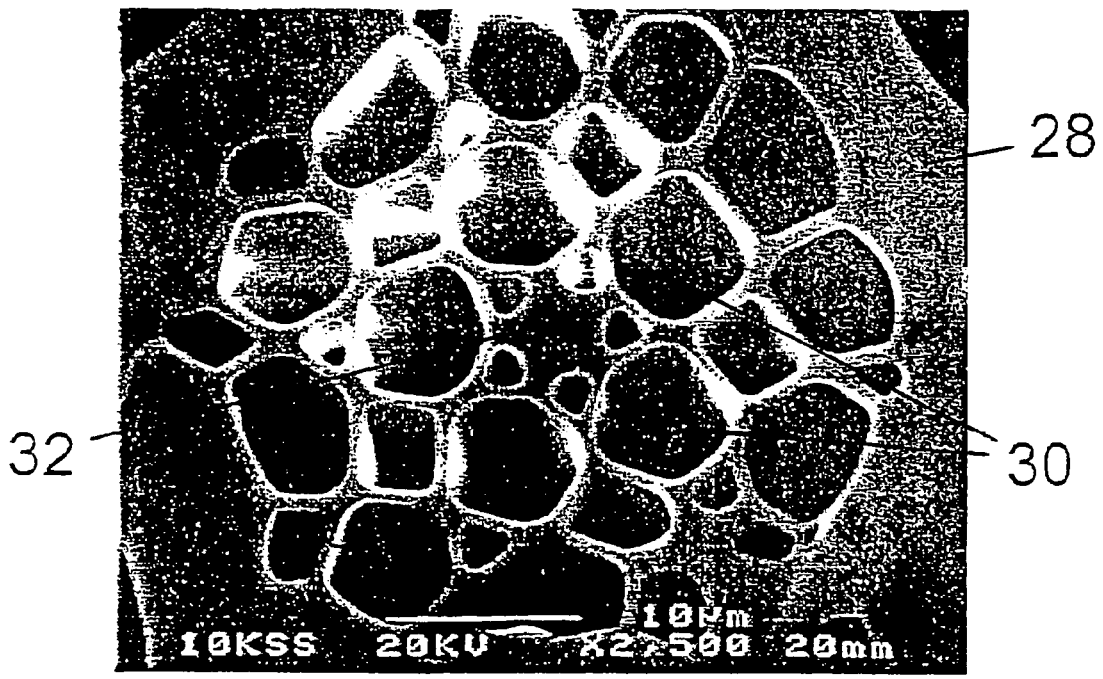
FIG. 5 is an expanded view of the holey fibre region of the holey fibre structure of FIG. 4.

FIG. 5 is a magnified view of the centre region of the holey fibre structure shown in FIG. 4. The holey fibre comprises a solid core 32 surrounded by a cladding 30 comprising hole rings generally concentrically arranged about the core. It will be understood that the holes will not form perfect circles around the core owing to the realities of the drawing process. The term concentric is thus not to be construed with any geometric rigour in this document. The cladding is in turn surrounded by the remnant 28 of the outer jacket of the preform. In other embodiments of the invention, the core could be hollow instead of solid, for example for photonic crystal fibre.

As well as the holey fibre of FIG. 5, a range of other similarly capillary-supported holey fibres of various dimensions have been pulled. By contrast, the inventors attempts to produce fibres with a thick outer jacket, according to the prior art approach described above with reference to FIG. 2, have been tended to result in loss of structural integrity of the core.

The large change in lateral feature size between the holey fibre on the one hand and the support tubes on the other hand is apparent. The support capillaries preferably have an outside diameter at least five or ten times greater than that of the holey fibre 20.

In FIG. 4 it can be seen that the holey fibre 20 has an outside diameter somewhat smaller than that of the support capillaries 22. Generally, these two lateral dimensions will be comparable. Specifically, it is preferred that the tubular support structures 22 have lateral dimensions of between one fifth and five times that of the holey fibre, more especially between one half and twice that of the holey fibre.

Figure 6:
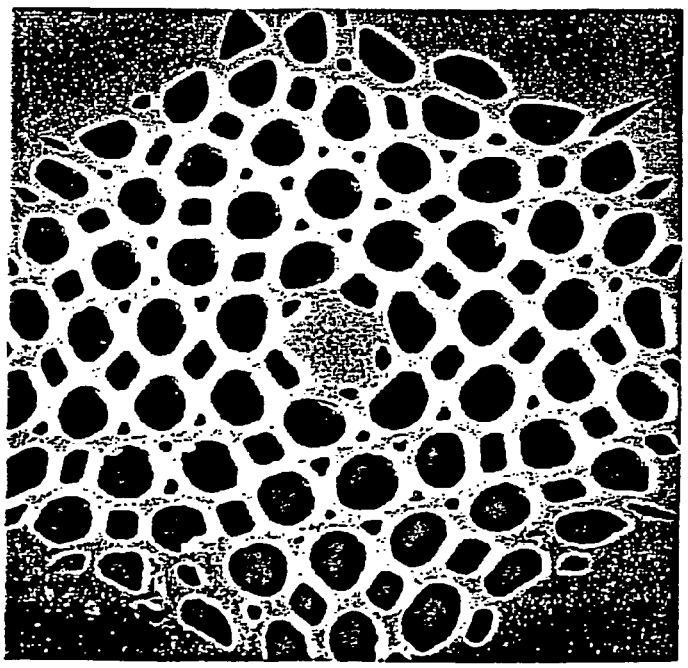
FIG. 6 is a cross-section of the holey fibre region of a holey fibre structure according to another example of the invention.

FIG. 6 is a cross-section of the central region of another holey fibre structure according to the invention. In this example, a larger number of cladding capillaries were used in the preform to form a larger number of generally concentric hole rings in the cladding. Otherwise the example of FIG. 6 will be understood from the previous description.

Although the above examples uses tubes as a basis for the holey fibre preform, it will be understood that other shapes could be used either in the holey support structure or for the holey cladding part of the structure. It is sufficient that the holey outer support structure and holey cladding have a sufficient number of gaps or cavities to provide the desired properties. It will also be understood that the hole arrangement in the support structure will generally have no bearing on the optical properties of the fibre, since the fibre waveguide modes will usually have no significant power outside the holey cladding. Periodic or aperiodic arrangements may be used. It will also be understood that the holes in the cladding need not be periodic, unless the fibre is intended to have photonic crystal effects.

Holey fibre structures according to the invention may find application in many of the areas previously proposed to be of interest for holey fibres.

One application is sensing. It has been proposed that a fluid, i.e. gas or liquid, is present in the fibre cavities. A property of the fluid is then sensed by its effect on that part of the optical mode, generally an evanescent wave part, which propagates in the holey cladding region.

Another application suggested for holey fibres is for low-loss telecommunication fibre. Propagation losses may be reduced in a holey fibre, by virtue of the lower losses associated with the holes relative to the glass regions of the fibre. More fundamentally, a holey fibre with a photonic band gap could reduce losses through photonic crystal effects.

Some specific applications of interest are:
1) transport of high power optical beams (low optical non-linearity fibre);
2) low-loss optical fibre for transmission systems;
3) optical sensors (gas detection, liquid composition, medical);
4) atom optics;
5) optical manipulation of microscopic particles;
6) particle separation (by mass, induced polarisability, electric dipole moment);
7) Raman lasers;
8) non-linear optical devices;
9) referencing of a laser to specific gas absorption lines;
10) metrology; and
11) dispersion compensation in transmission systems (holey fibre structures embodying the invention can be made to exhibit high dispersion).

REFERENCES

1. T A Birks et al: Electronic Letters, vol. 31, pages 1941–1943 (1995)
2. U.S. Pat. No. 5,802,236: DiGiovanni et al: Lucent Technologies Inc.
3. P J Bennett et al: Optics Letters, vol. 24, pages 1203–1205 (1999)
4. P J Bennett et al: CLEO '99, CWF64, page 293

What is claimed is:

1. An optical fiber structure comprising a holey fiber arranged in a holey outer support structure, wherein the holey fiber is contained by a tubular structure and wherein the holey outer support structure comprises a plurality of tubular structures arranged around the tubular structure.

2. An optical fiber structure according to claim 1, wherein the tubular structures of the holey outer support structure have a lateral size at least five times greater than a lateral size of holes in the holey fiber.

3. An optical fiber structure according to claim 1, wherein the tubular structures of the holey outer support structure have a lateral size at least ten times greater than a lateral size of holes in the holey fiber.

4. An optical fiber structure according to claim 1, wherein the holey fiber comprises a solid or hollow core surrounded by a holey cladding.

5. An optical fiber structure according to claim 4, wherein the holey cladding comprises cavities arranged in a plurality of rings concentrically about the core.

6. An optical fiber structure according to claim 5, wherein the number of rings is two.

7. An optical fiber structure according to claim 5, wherein the number of rings is three, four, five or six.

8. An optical fiber structure according to claim 1, wherein the tubular structures of the holey outer support structure have lateral dimensions of between one fifth and five times that of the holey fiber.

9. An optical fiber structure according to claim 1, wherein the tubular structures of the holey outer support structure have lateral dimensions of between one half and twice that of the holey fiber.

10. An optical fiber structure according to claim 1, wherein the holey outer support structure further comprises an outer jacket surrounding the arrangement of tubular structures.

11. An optical fiber preform comprising:
   (a) a core rod;
   (b) a plurality of cladding capillaries arranged around the core rod;
   (c) an inner jacket containing the cladding capillaries; and
   (d) a plurality of support capillaries arranged around the inner jacket.

12. An optical fiber preform according to claim 11, further comprising an outer jacket containing the support capillaries.

13. An optical fiber preform according to claim 11, wherein the support capillaries have lateral dimensions between one fifth and five times that of the inner jacket.

14. An optical fiber preform according to claim 11, wherein the support capillaries have lateral dimensions between one half and twice that of the inner jacket.

15. An optical fiber preform according to claim 11, wherein the core rod is hollow.

16. An optical fiber preform according to claim 11, wherein the core rod is solid.

17. An optical fiber preform according to claim 11, wherein the cladding capillaries are arranged in a plurality of rings concentrically about the core rod.

18. An optical fiber preform according to claim 17, wherein the number of rings is two.

19. An optical fiber preform according to claim 17, wherein the number of rings is three, four, five or six.

20. The optical fiber preform of claim 11, wherein the plurality of support capillaries have a lateral size greater than a lateral size of the plurality of cladding capillaries.

21. A method of making a holey fiber preform comprising:
   (a) arranging a core rod and a plurality of cladding capillaries within a first jacket;
   (b) arranging the first jacket and a plurality of support capillaries to form a tube assembly; and
   (c) reducing the tube assembly to a preform.

22. A method according to claim 21, wherein the support capillaries are arranged within a second jacket.

23. A method according to claim 21, wherein the support capillaries are arranged within an outer jacket.

24. The method of claim 21, wherein the plurality of support capillaries have a lateral size greater than a lateral size of the plurality of cladding capillaries.

25. A method of making a holey fiber comprising:
   (a) making a holey fiber preform according to the method of claim 21; and
   (b) drawing a holey fiber from the preform.

26. A method of guiding light along an optical fiber structure, the method comprising using an optical fiber structure comprising a holey fiber arranged in a holey outer support structure, wherein the holey fiber is contained by a tubular structure and wherein the holey outer support structure comprises a plurality of tubular structures arranged around the tubular structure, and arranging the light to have a mode field extending in a cross-sectional plane through the holey fiber, wherein the mode field is confined in the holey fiber so as to have less than one of 10%, 5%, 2%, 1%, 0.5% and 0.01% of its power extending beyond the holey fiber into the holey outer support structure.

27. An optical fiber structure comprising a holey fiber arranged in a holey outer support structure, wherein the holey fiber is surrounded by a first tubular structure and wherein the holey outer support structure comprises a plurality of further tubular structures arranged around the first tubular structure.

28. An optical fiber structure according to claim 27, wherein the further tubular structures of the holey outer support structure have a lateral size at least five times greater than a lateral size of holes in the holey fiber.

29. An optical fiber structure according to claim 27, wherein the further tubular structures of the holey outer support structure have a lateral size at least ten times greater than a lateral size of holes in the holey fiber.

30. An optical fiber structure according to claim 27, wherein the holey fiber comprises a solid or hollow core surrounded by a holey cladding.

31. An optical fiber structure according to claim 30, wherein the holey cladding comprises cavities arranged in a plurality of rings concentrically about the core.

32. An optical fiber structure according to claim 31, wherein the number of rings is two.

33. An optical fiber structure according to claim 31, wherein the number of rings is three, four, five or six.

34. An optical fiber structure according to claim 27, wherein the further tubular structures of the holey outer support structure have lateral dimensions of between one fifth and five times that of the holey fiber.

35. An optical fiber structure according to claim 27, wherein the further tubular structures of the holey outer support structure have lateral dimensions of between one half and twice that of the holey fiber.

36. An optical fiber structure according to claim 27, wherein the holey outer support structure further comprises an outer jacket surrounding the arrangement of further tubular structures.

37. A method of guiding light along an optical fiber structure, the method comprising using an optical fiber structure comprising a holey fiber arranged in a holey outer support structure, wherein the holey fiber is surrounded by a first tubular structure and wherein the holey outer support structure comprises a plurality of further tubular structures arranged around the first tubular structure, and arranging the light to have a mode field extending in a cross-sectional plane through the holey fiber, wherein the mode field is confined in the holey fiber so as to have less than one of 10%, 5%, 2%, 1%, 0.5% and 0.01% of its power extending beyond the holey fiber into the holey outer support structure.

* * * * *

UNITED STATES PATENT AND TRADEMARK OFFICE
CERTIFICATE OF CORRECTION

PATENT NO. : 6,968,107 B2
APPLICATION NO. : 10/344731
DATED : November 22, 2005
INVENTOR(S) : Walter Belardi et al.

It is certified that error appears in the above-identified patent and that said Letters Patent is hereby corrected as shown below:

Claim 1, column 6, line 43, "a tubular structure" should read --an inner jacket--.

Claim 1, column 6, line 45, "tubular structure." should read --inner jacket.--.

Claim 20, column 7, line 37, "size greater" should read --size at least five times greater--.

Claim 24, column 7, line 50, "size greater" should read --size at least five times greater--.

Claim 26, column 7, line 59, "by a" should read --by an--.

Claim 26, column 8, line 1, "tubular structure" should read --inner jacket--.

Claim 26, column 8, line 3, "tubular structure," should read --inner jacket,--.

Claim 27, column 8, line 11, "a first tubular structure" should read --an inner jacket.--

Claim 27, column 8, line 13, delete "further".

Claim 27, column 8, lines 13-14, "first tubular structure." should read --inner jacket.--.

Claim 28, column 8, line 16, delete "further".

Claim 29, column 8, line 20, delete "further".

Claim 34, column 8, line 35, delete "further".

Claim 35, column 8, line 39, delete "further".

Claim 36, column 8, line 44, after "of" delete "further".

Claim 37, column 8, line 50, "a first tubular structure" should read

--an inner jacket--.

UNITED STATES PATENT AND TRADEMARK OFFICE
CERTIFICATE OF CORRECTION

PATENT NO. : 6,968,107 B2
APPLICATION NO. : 10/344731
DATED : November 22, 2005
INVENTOR(S) : Walter Belardi et al.

It is certified that error appears in the above-identified patent and that said Letters Patent is hereby corrected as shown below:

Claim 37, column 8, line 51, delete "further".

Claim 37, column 8, line 52, "first tubular structure," should read
--inner jacket,--.

Signed and Sealed this

Fifth Day of September, 2006

JON W. DUDAS
*Director of the United States Patent and Trademark Office*